United States Patent
Lee et al.

(10) Patent No.: US 8,971,182 B2
(45) Date of Patent: Mar. 3, 2015

(54) METHOD FOR DATA TRAFFIC OFFLOADING AND APPARATUS USING THE SAME

(75) Inventors: Eun Jong Lee, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 312 days.

(21) Appl. No.: 13/568,953

(22) Filed: Aug. 7, 2012

(65) Prior Publication Data

US 2014/0043966 A1 Feb. 13, 2014

(51) Int. Cl.
*H04W 28/08* (2009.01)

(52) U.S. Cl.
USPC ............................. 370/230; 370/252; 370/332

(58) Field of Classification Search
CPC . H04W 28/08; H04W 72/1252; H04L 47/125
USPC .......................................... 370/230, 252, 332
See application file for complete search history.

(56) References Cited

U.S. PATENT DOCUMENTS

| 2009/0310568 | A1* | 12/2009 | Chen et al. ..................... 370/332 |
| 2012/0004009 | A1* | 1/2012 | Lindoff et al. ................. 455/522 |
| 2012/0302240 | A1* | 11/2012 | Tamaki et al. ................. 455/436 |

* cited by examiner

*Primary Examiner* — Andrew Chriss
*Assistant Examiner* — Romani Ohri
(74) *Attorney, Agent, or Firm* — Lee, Hong, Degerman, Kang & Waimey (57) ABSTRACT

A method for data traffic offloading in a mobile communication system supporting a multi-radio access technology (RAT) and an apparatus using the method is provided. A mobile station receives information on a traffic load of a primary communication system from a base station. The mobile station determines whether to perform offloading to a secondary communication system on the basis of the traffic load of the primary communication system.

14 Claims, 9 Drawing Sheets

METHOD FOR DATA TRAFFIC OFFLOADING AND APPARATUS USING THE SAME

BACKGROUND OF THE INVENTION

1. Technical Field

The present invention relates to a mobile communication system, and more particularly, to a method for data traffic offloading in a mobile communication system supporting a multi-radio access technology (RAT) and an apparatus using the method.

2. Discussion of the Related Art

A multi-radio access technology (RAT) network is a wireless communication environment in which two or more heterogeneous networks exist and a mobile station can perform communication by accessing the two or more heterogeneous networks. Herein, the mobile station capable of performing communication with the two or more heterogeneous networks is called a multi-RAT advanced mobile station (AMS) or a multi-system AMS.

Comparing with a specific network, the heterogeneous network (or heterogeneous system) is a network which uses a communication mechanism different from that used in the specific network. Examples of the heterogeneous network include a WiMAX network which is one example of a cellular network and a WiFi network which is one example of a wireless local area network (WLAN).

The RAT is a technical type used in radio access. For example, the RAT may include GSM/EDGE radio access network (GERAN), UMTS terrestrial radio access network (UTRAN), evolved-UMTS terrestrial radio access network (E-UTRAN), WiMAX, LTE (-A), WiFi, etc. That is, the GERAN, the UTRAN, the E-UTRAN, the WiMAX and/or the WiFi coexist in the same region.

The multi-RAT increases a peak throughput, and enables off-loading between heterogeneous networks.

SUMMARY OF THE INVENTION

The present invention provides a method for scanning a neighbor access point (AP) by a multi-radio access technology (RAT) advanced mobile station (AMS) and an apparatus using the method.

The present invention also provides a definition on information included in a message exchanged between an advanced base station (ABS) and an AMS to perform neighbor AP scanning.

The present invention also provides a method for effectively offloading data traffic in a broadband wireless communication system supporting a cellular network and a wireless local area network (WLAN) and an apparatus using the method.

An embodiment of the present invention relates to a communication method performed by a base station in a mobile communication system. The method includes monitoring a traffic load of a primary communication system, determining an offloading target mobile station on the basis of the traffic load, and instructing the offloading target mobile station to perform offloading to a secondary communication system.

The primary communication system may be based on institute of electrical and electronics engineers (IEEE) 802.16 or long term evolution (LTE), and the secondary communication system may be an IEEE 802.11-based wireless local area network (WLAN).

The instructing the offloading target mobile station may include transmitting a message for instructing the offloading target mobile station to scan neighbor access points (APs).

If the traffic load exceeds a first traffic threshold, the offloading target mobile station may be determined on the basis of a carrier to interference ratio (CINR) or a received signal strength indicator (RSSI) between the offloading target mobile station and the base station.

If the traffic load exceeds a second traffic threshold, the method may include instructing all mobile stations in the primary communication system to perform offloading to the secondary communication system.

Another embodiment of the present invention relates to a communication method performed by a mobile station in a mobile communication system. The method includes receiving information on a traffic load of a primary communication system from a base station, and determining whether to perform offloading to a secondary communication system on the basis of the traffic load of the primary communication system.

The primary communication system may be based on IEEE 802.16 or LTE, and the secondary communication system may be an IEEE 802.11-based WLAN.

If offloading to the secondary communication system is performed, scanning at least one neighbor AP may be performed.

The determining of the offloading may comprise confirming whether the mobile station is located in the coverage of the secondary communication system. If a traffic load of the primary communication system exceeds a third traffic threshold and the mobile station is located in the coverage of the secondary communication system, offloading to the secondary communication system may be performed.

The determining of the offloading may comprise confirming a size of data traffic generated by the mobile station. If a traffic load of the primary communication system exceeds a third traffic threshold and the size of the data traffic generated by the mobile station exceeds a fourth traffic threshold, offloading to the secondary communication system may be performed.

The determining of the offloading may comprise confirming quality of service (QoS) of data traffic generated by the mobile station. Whether to perform offloading to the secondary communication system may be determined on the basis of the QoS.

The determining of the offloading may comprise confirming a carrier to interference ratio (CINR) between the mobile station and the base station. If a traffic load of the primary communication system exceeds a third traffic threshold and the CINR between the mobile station and the base station is less than or equal to a first CINR threshold, offloading to the secondary communication system may be performed.

The determining of the offloading may comprise confirming a CINR between the mobile station and the neighbor AP. If a traffic load of the primary communication system exceeds a third traffic threshold and the CINR between the mobile station and the neighbor AP exceeds a second CINR threshold, offloading to the secondary communication system may be performed.

Another embodiment of the present invention relates to a mobile station in a mobile communication system. The mobile station includes a radio frequency (RF) unit for transmitting and receiving a radio signal, and a processor operatively connected to the RF unit and implementing a radio interface protocol. The processor is configured for: receiving information on a traffic load of a primary communication system from a base station, and determining whether to perform offloading to a secondary communication system on the basis of the traffic load of the primary communication system.

The processor may be configured for scanning a neighbor access point (AP).

DESCRIPTION OF EXEMPLARY EMBODIMENTS

Figure 1:
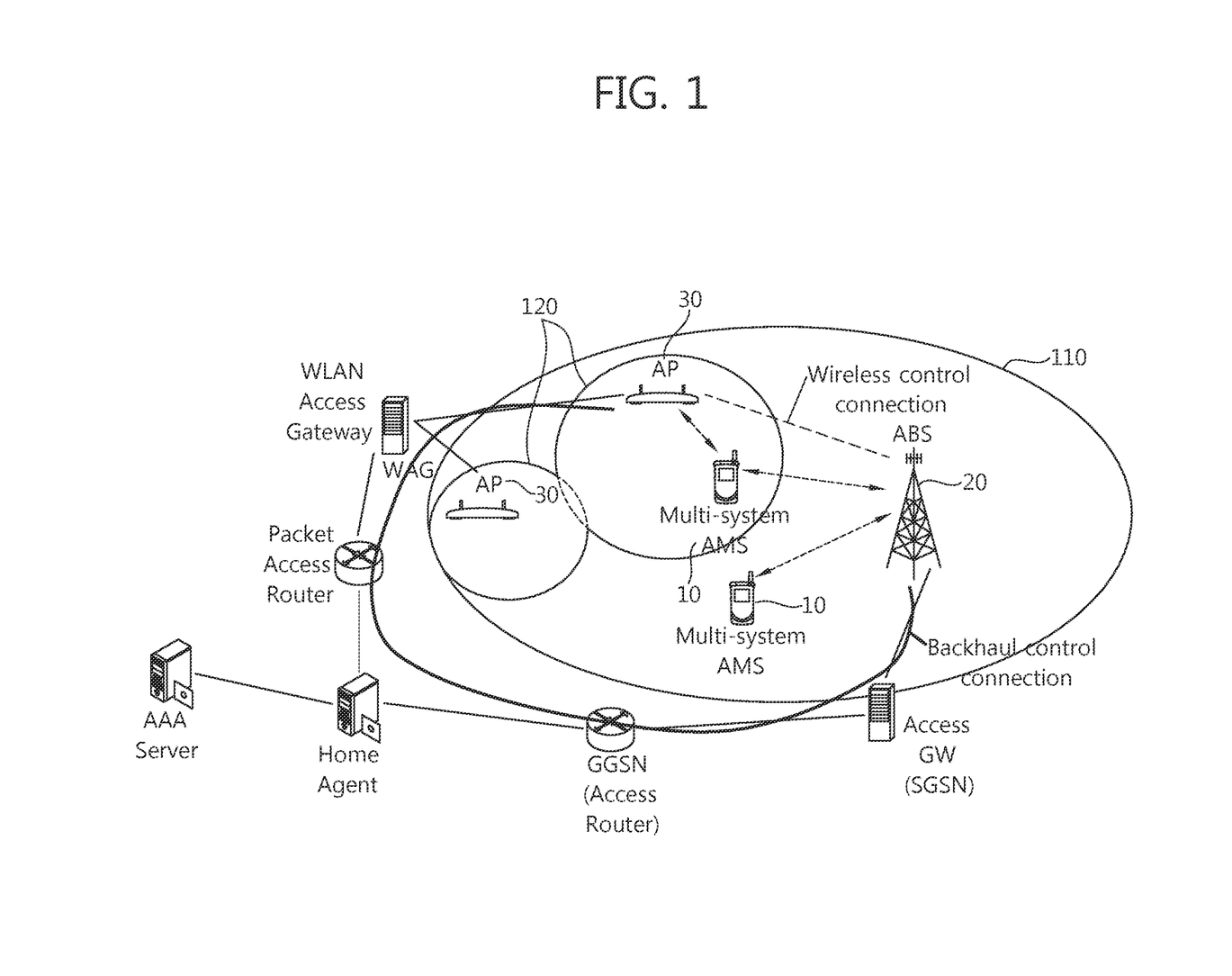
FIG. 1 shows a multi-radio access technology (RAT) network according to the present invention.

FIG. 1 shows a multi-radio access technology (RAT) network according to the present invention.

Referring to FIG. 1, a multi-RAT network 100 includes a primary system 110 and a secondary system 120. The primary system 110 is a communication system having a wider coverage such as WiMAX or long term evolution (LTE). An advanced base station (ABS) 20 of the primary system 110 is a fixed station which communicates with an advanced mobile station (AMS) 10, and can also be called as another terminology, such as an evolved-NodeB (eNB) or the like. The ABS 20 always remains in a certain state such as an inactive mode, a sleep mode, or an idle mode.

The secondary system 120 is a communication system having a smaller coverage, such as a wireless local area network (WLAN). The secondary system 120 can be optionally added to or deleted from the AMS 10, and is mainly used to transmit data which requires a higher bandwidth. The secondary system 120 and the AMS 10 can be connected to each other or disconnected from each other after confirmed by the ABS 20. Only when the primary system 110 and the AMS 10 are connected to each other, data can be transmitted from an AP 30 to the AMS 10 or from the AMS 10 to the AP 30.

The AMS 10 may be fixed or mobile, and may be referred to as another terminology, such as a multi-system terminal, a user terminal (UT), a subscriber station (SS), a mobile terminal (MT), a wireless device, etc. The AMS 10 can share that it has capability for a multi-system according to capability negotiation procedure during a connection establishment with the primary system 110. When the AMS 10 enters the coverage of the secondary system, the ABS 20 can receive information on access to the secondary system 120. Further, when there is data to be transmitted or received by the AMS 10 via the secondary system 120, the ABS 20 can receive access information on corresponding data flow.

Meanwhile, a backhaul control connection or a wireless control connection through a backbone (or cellular air interface) network exists between the ABS 20 of the primary system 110 and the AP 30 of the secondary system.

Figure 2:
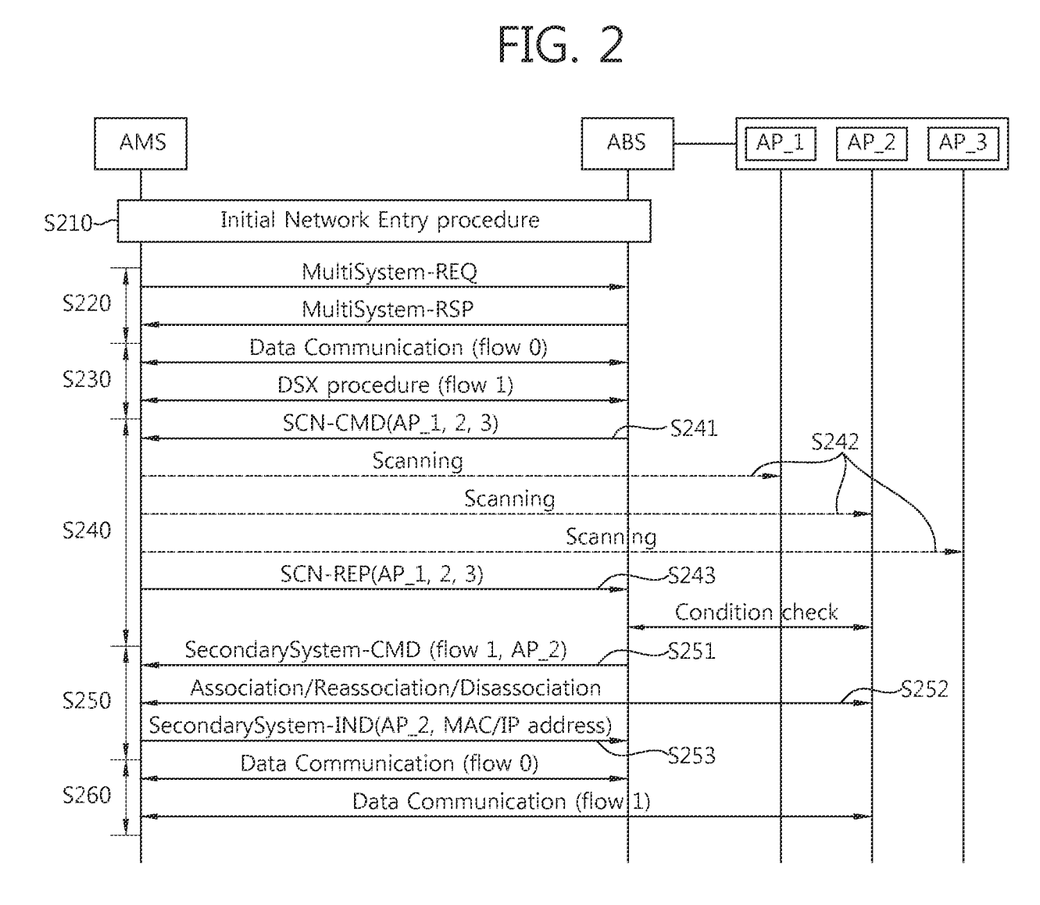
FIG. 2 shows a network entry and secondary system management procedure of an advanced mobile station (AMS) according to an embodiment of the present invention.

FIG. 2 shows a network entry and secondary system management procedure of an AMS according to an embodiment of the present invention.

An AMS and an ABS perform an initial entry procedure of a primary system (S210). The initial network entry procedure (S210) of FIG. 2 is equal to the conventional 802.16m procedure. However, since REG-REQ/REP must be used to recognize that the AMS is a terminal supporting a multi-system (network or RAT), an indication for multi-system capability of the AMS can be added to the REG-REQ/REP message. For example, if the multi-system capability is 1, an additional capability negotiation is performed to support the AMS, and if the multi-system capability is 0, the additional capability negotiation for supporting the AMS may not be performed.

In addition, in the initial network entry procedure (S210), the ABS can transmit secondary system information to the AMS. The secondary system information is information regarding a heterogeneous system belonging to the same coverage as the primary system. The secondary system information can be broadcasted by using an AAI_NBR-ADV or MultiRAT-ADV message, or can be unicasted to the AMS supporting the multi-system by using the MultiRAT-ADV message.

The AMS and the ABS perform a multi-system capability negotiation (S220). For example, if the AMS has multi-system (network or RAT) capability, an additional multi-system specific capability negotiation such as MultiRAT-REQ/RSP can be performed between the AMS and the ABS. Meanwhile, since the AMS does not have to know all secondary systems belonging to the same coverage as the primary system, during the multi-system capability negotiation, the ABS can unicast only a list of required secondary systems to the AMS.

The multi-system (or RAT) capability negotiation is additionally performed after general network (re)entry. In a network reentry case, the multi-system (or RAT) capability negotiation can be skipped. In addition, in a handover case, a target ABS can perform a pre-negotiation through a backbone network from a serving ABS.

The ABS can save the multi-system (or RAT) capability of the AMS, and thereafter when the AMS enters an idle mode and a specific time elapses, can discard the multi-system (or RAT) capability of the AMS.

In addition, if the network reentry is performed before a multi-system (or RAT) information retain timeout, the multi-system (or RAT) capability negotiation can be skipped.

In the multi-system capability negotiation procedure (S220), the AMS transmits a multi-system capability request message to the ABS, and the ABS transmits a multi-system capability response message (or message ACK) to the AMS. In this case, the multi-system capability request message can include the following information.

AMS's wireless local area network (WLAN)-related capability information

AMS's 802.11 media access control (MAC) address

AMS's preferred AP

Protocol version (e.g. 11a/b/n . . . )

QoS type or traffic characteristics requiring 802.11 communications

Etc.

The multi-system capability response message can include information regarding candidate APs.

The AMS and the ABS can transmit information regarding a preferred system for corresponding flow while performing the connection establishment (S230). This process is also called a flow/system mapping method. For example, the AMS and the ABS transmit information regarding whether the corresponding flow prefers 802.11 or 802.16 while the connection establishment is performed by using a DSA-REQ/REP message. In this case, when the corresponding flow prefers 802.11, the ABS can be configured such that data is transmitted through an 802.11 link upon detecting an AP. Herein, an AAI_SS-CMD/IND message can be used.

The AMS scans a neighbor AP (S240). A process of scanning the neighbor AP by the AMS is also called secondary system scanning. The secondary system scanning procedure (S240) can be performed by using several methods.

For one example, the AMS can perform the scanning procedure (S240) for the neighbor AP in a periodic or event-triggered manner on the basis of the secondary system information received in the initial network entry procedure (S210) or the message received from the ABS in the multi-system capability negotiation procedure (S220).

For another example, when specific flow needs to be transmitted through a WLAN, the ABS can instruct the AMS to scan the neighbor AP. In this case, the specific flow can be configured in the multi-system capability negotiation, and whether the specific flow needs to be transmitted via the WLAN can be known through dynamic service addition (DSA).

Returning to FIG. 2, the ABS can instruct the AMS to scan the neighbor AP by using a MultiRAT_SCN-CMD message (S241). In this case, the ABS can instruct to scan the neighbor AP by using a MultiRAT_SCN-CMD element header (EH) instead of the MultiRAT_SCN-CMD message. The MultiRAT_SCN-CMD message can include information for fast AP detection of the AMS, for example, a service set identifier (SSID) of the neighbor AP, a beacon transmission period, and scanning interval information.

Upon receiving the MultiRAT_SCN-CMD message from the ABS, the AMS scans neighbor APs by receiving a beacon from the neighbor AP or by transmitting and/or receiving a probe request/response (S242). Scanning of the neighbor AP by receiving the beacon from the AP is called passive scanning, and scanning performed by transmitting and/or receiving the probe request/response is called active scanning.

Upon scanning the neighbor AP, the AMS transmits a MultiRAT_SCN-REP message to the ABS (S243). The MultiRAT_SCN-REP message can include each AP's received signal strength indication (RSSI) and a scanning result of a detected AP such as a preferred AP of the AMS.

If the AMS detects two or more secondary systems, the ABS selects an optimal AP and reports it to the AMS. This process is also called secondary system selection. For example, the ABS can select the optimal AP by using a specific metric such as the same operator, AMS's priority, channel quality, load balancing, carrier traffic, etc. In this case, the ABS can report the optimal AP by using a MAC control message such as AAI_SS-CMD.

Meanwhile, if the AMS fails to detect the secondary system or the ABS fails to receive a response message such as MultiRAT_SCN-REP during a specific time period, the ABS can transmit and receive data of corresponding flow through a primary system. The specific time can be defined as MultiRAT_SCAN_TIMEOUT or MultiRAT_SCAN_DEADLINE. If the ABS fails to receive a response message during MultiRAT_SCAN_TIMEOUT (or MultiRAT_SCAN_DEADLINE) from a time of transmitting the MultiRAT_SCN-CMD message, the data of the corresponding flow can be transmitted and received through the primary system such as 802.16m.

S251 to S253 relate to AMS's secondary system join (S250).

The ABS instructs the AMS to associate with the AP (S251). For example, the ABS can instruct the association with the AP by transmitting AAI_SS-CMD including the selected AP, flow information to be transmitted to the secondary system, an authentication scheme, etc.

For another example, the AMS can instruct the association with the AP in such a manner that the AMS transmits a message for requesting the ABS to associate with the AP, and the ABS transmits a confirmation message for the request message. The request message can include a preferred AP's SSID, flow information to be transmitted to the secondary system, a preferred authentication scheme, etc.

Meanwhile, after receiving the message instructing the association with the AP, the AMS can transmit MSG-ACK in response to the reception.

The AMS performs the association with a specific AP (S252). In this case, the AMS transmits and/or receives an association request/response with respect to the specific AP.

In addition, if the AMS and the specific AP support 802.11e, a traffic stream (TS) setup can be performed in S252. In this case, a QoS mapping table can be defined between 802.11 and 802.16, and the AMS can allocate a proper traffic stream identifier (TSID) to a flow identifier (FID) on the basis of the QoS mapping table, and can transmit and receive corresponding connection data through an 802.11e link.

Meanwhile, the AMS can acquire an Internal Protocol (IP) address of the AP through S252.

The AMS successfully connects to the AP and reports the result to the ABS (S253). In this case, the AMS can report a MAC/IP address of the AP to the ABS by using AAI_SS-IND, and the ABS can store IP address binding information for corresponding flow of the AMS.

If all procedures of the secondary system join ends, data for specific flow is transmitted and received via the secondary system (S260). Downlink (DL) data is subjected to IP flow mapping by the ABS so that it is transmitted to the AMS via the AP, and uplink (UL) data is transmitted via the WLAN.

Meanwhile, the AMS can release the connection with the AP through reassociation or disassociation with the AP. This procedure is also called secondary system release. The secondary system release can be triggered when a signal of the AP is decreased below a specific threshold by a DSC or DSD message between the ABS and the AMS, and can be performed by using an AAI_SS-REQ/CMD/IND or MSG-ACK message. For example, the secondary system release can be performed when the AMS transmits an AAI_SS-REQ message or when the ABS transmits an AAI_SS-CMD message.

Meanwhile, the ABS can support seamless flow mobility between multi-RATs. For example, if the AMS is out of the coverage of the WLAN and thus there is no neighbor AP, data transmitted via the WLAN can be seamlessly transmitted via the ABS. That is, seamless flow mobility can be supported between the AP and the ABS. AP disassociation must be performed to support the seamless flow mobility between the AP and the ABS. The AP disassociation occurs when there is no neighbor AP or when data transmission for corresponding flow is complete, and can be performed by exchanging an AAI_DSA message between the ABS and the AMS. In addition, when the AMS detects a new neighbor AP, seamless flow mobility can be supported between APs. In order to support the seamless flow mobility between APs, AP reassociation must be performed.

Meanwhile, in general, the WLAN provides a higher data rate in a narrow coverage. If the AMS having multi-system capability is currently moving fast, there may be a situation where the AMS passes the coverage of the WLAN for a short time period. In such a situation, since a time period in which the AMS stays in the coverage of the WLAN is short, data communication for connecting/releasing the connection with the WLAN may act as an unnecessary overload to the AMS and the ABS. In order to solve this problem, if the AMS satisfies certain criteria for joining the WLAN, the ABS starts a timer such as SecondarySystemJoin_WaitingTime, and can check the criteria again at a time where the timer expires. Even at the timer expiration time, if the criteria are satisfied, the ABS can transmit an SS_CMD message so that the AMS can join the WLAN. The criteria in which the AMS joins the WLAN may imply a condition related to a parameter regarding a cell property such as cell channel quality.

In addition, according to the conventional secondary system management procedure, it is clear that AP scanning is performed, but a detailed solution regarding a specific metric to be used as a reference when performing the AP scanning is not defined yet. Therefore, the present invention defines a trigger metric for the AP scanning, and defines a specific procedure by which a result of the AP scanning is transmitted to the ABS.

If it is determined that the AMS needs to transmit and receive data via the secondary system such as the WLAN, the ABS instructs multi-RAT system scanning of the AMS. This can be determined on the basis of a location and/or speed of the AMS, and can be triggered by using a multi-RAT scan command message. The multi-RAT scan command message can include the following parameter to facilitate AP detection of the AMS.

A beacon interval can be included instead of a scan interval included in the conventional AAI_SCN-RSP message. In the AMS, data communication via the primary system may stop during the beacon interval. This is for interference mitigation between the primary system and the secondary system. Meanwhile, both of DL/UL data transmissions may stop, and only UL data transmission may stop.

The remaining parts of information other than the scan interval may be equal to those of information included in the conventional AAI_SCN-RSP message.

AAI_MultiRAT-SCAN-CMD message (=SCAN.request) BSSType (infrastructure BSS, IBSS, or both), BSSID (specific or wildcard BSSID), SSID (desired SSID or the wildcard SSID), ScanType (active or passive scanning), ProbeDelay (Delay to be used prior to transmitting a Probe frame), ChannelList (a list of channels that are examined when scanning for a BSS), MinChannelTime (The minimum time to spend on each channel when scanning), MaxChannelTime (The maximum time to spend on each channel when scanning), RequestInformation (optional), VendorSpecificInfo Upon receiving a Multi-RAT scan command message, the AMS delivers the message to MAC, and starts to scan the neighbor AP on the basis of the information included in the message.

A scanning result can be reported to the ABS, periodically, at one time or when trigger condition(s) is satisfied. The following parameter can be included in the multi-RAT scan response.

AAI_MultiRAT-SCAN-RSP message (=SCAN.confirm) BSSDescriptionSet (to indicate the results of the scan request), BSSDescriptionFromMeasurementPilotSet (to indicate the results of the scan request derived from Measurement Pilots), ResultCode (Indicates the result of the MLMESCAN confirm primitive), VendorSpecificInfo Meanwhile, when the trigger condition is satisfied even if there is no multi-RAT scan command message according to the trigger condition defined by the ABS, the AMS supporting the multi-system can scan the neighbor AP and report the scanning result. The trigger condition can be broadcasted to the AMS by using AAI_SCD, AAI_NBR-ADV, SFH, AAI_MC-ADV or MultiRAT_NBR-ADV. The AP-specific trigger condition can be defined as a variable size in AAI_SCD, AAI_NBR-ADV, SFH, AAI_MC-ADV, or MultiRAT_NBR-ADV. In addition, if a metric of scan initiation is an AMC specific value, the AP-specific trigger condition is preferably unicasted.

Meanwhile, the trigger condition can include a trigger action and a trigger metric. The trigger action indicates initiate scanning (omissible) and transmit scan results. The trigger metric is a metric regarding initiate scanning and transmit scan results indicated by the trigger action.

A condition in which the AMS starts scanning of the neighbor AP can be determined by traffic transmitted through DSA. For example, a QoS property or traffic configured by using a DSA message can be used as the metric. In addition, if traffic desired to be transmitted via the secondary system in the Multi-RAT capability negotiation procedure is defined and the traffic is generated in the DSA procedure, or if the secondary system is selected as a preferred system in the DSA procedure, the AMS can start scanning of the neighboring AP.

Meanwhile, the scan results include information regarding whether the metric of the neighbor AP is greater than or less than an absolute value.

Meanwhile, the ABS can define trigger conditions related to AP. The conditions can be defined when the AMS shall report AP scanning measurement results to the S-ABS.

Table 1 shows AP-specific trigger description. Trigger definitions are encoded using the description in Table 1.

TABLE 1

| Name | Legnth (bits) | Value |
| --- | --- | --- |
| Number of conditions | 2 | The number of conditions that are included in this trigger (see loop definition below). When more than one condition is included, this trigger is referred to as a complex trigger and is the logical AND combination of all the included conditions. |
| for (i = 0; i <= Number of conditions; i++){ | | |
| Type/Function/Action | 3 | See Table 2—for description |
| Trigger Value | 8 | Trigger value is the value used in comparing measured metric for determining a trigger condition. |

TABLE 1-continued

| Name | Legnth (bits) | Value |
|---|---|---|
| Trigger averaging parameter | 4 | The averaging parameter used for averaging this trigger metric according to equation (4). If not present, the default trigger averaging parameter in AAI-SCD is used.<br>0x0: 1<br>0x1: 1/2<br>0x2: 1/4<br>0x3: 1/8<br>0x4: 1/16<br>0x5: 1/32<br>0x6: 1/64<br>0x7: 1/128<br>0x8: 1/256<br>0x9: 1/512<br>0xA to 0xF: reserved |
| } | | |

The ABS may trigger the scanning of APs within its coverage by transmitting MultiRAT-SCN-CMD when deciding to join secondary system(s) for an AMS. The AMS receiving MultiRAT-SCN-CMD shall perform the scanning for the neighbor AP(s).

The ABS may specify trigger parameters for scan reporting of each AP in AAI-NBR-ADV (or AAI-MC-ADV or AAI_SCD or MultiRAT-ADV) message. An AMS shall perform the scan reporting when the conditions on the triggers are met.

Meanwhile, whether the scan reporting based on the trigger condition is required can be determined during the multi-RAT capability negotiation between the AMS and the ABS. If the AP is detected, a user may desire data transmission via the AP even if a low-strength signal is received. Therefore, during the capability negotiation, the AMS and the ABS can determine a reference value used as a criterion for determining whether the scanning report is required. For example, it is possible to configure a "SCAN reporting indication by trigger condition" bit in MultiRAT-REQ/RSP during MultiRAT capability negotiation.

Table 2 shows AP-specific trigger type/function/action description.

TABLE 2

| Name | Size (bits) | Value | Description |
|---|---|---|---|
| Type | 1 (MSB) | Trigger metric type:<br>0x0: CINR metric<br>0x1: RSSI metric | |
| Function | 1 | Computation defining scanning and reporting trigger condition:<br>0x0: Metric of neighbor AP is greater than absolute value<br>0x1:Metric of\neighbor AP is less than absolute value | |
| Action | 1 (LSB) | Action performed upon reaching trigger condition:<br>0b0: Respond on trigger with AAI_SCN-REP for neighbor AP<br>0b1: reserved | Action 0b0 applies to Function 0x0 and 0x1. |

Figure 3:
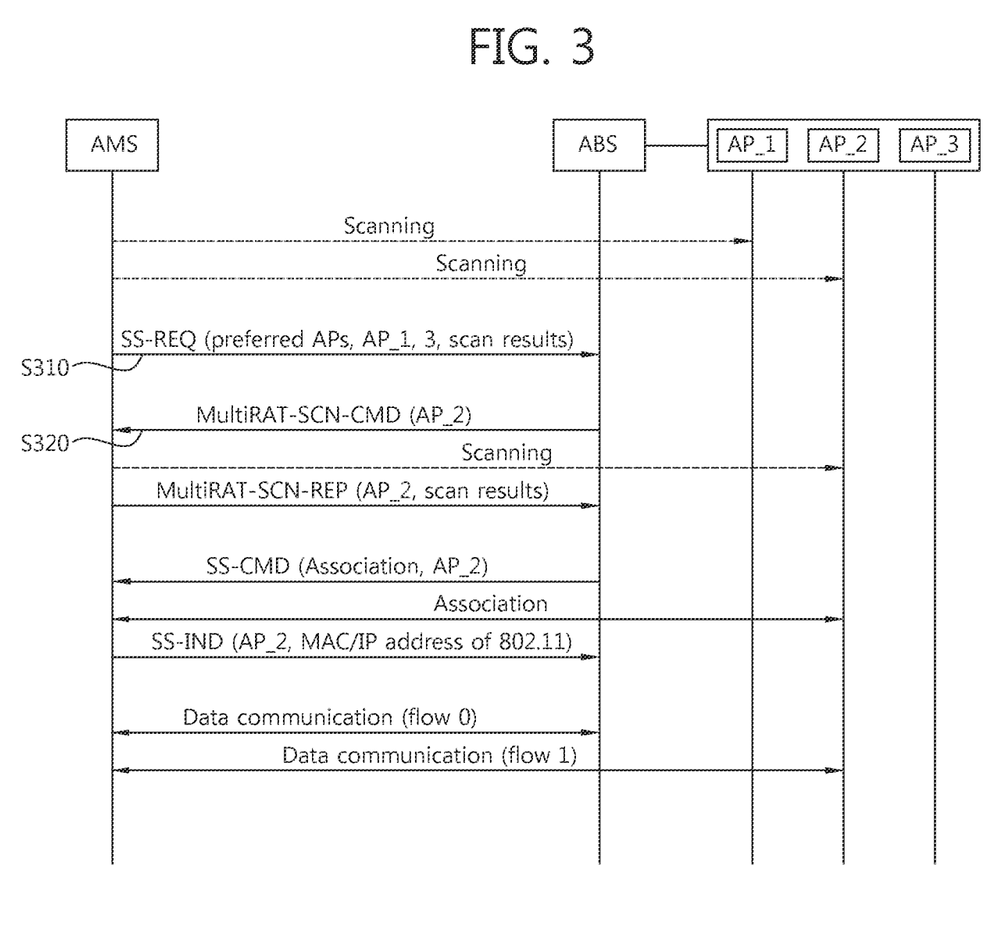
FIG. 3 and FIG. 4 show AMS-initiated access point (AP) scanning according to an embodiment of the present invention.
Figure 4:
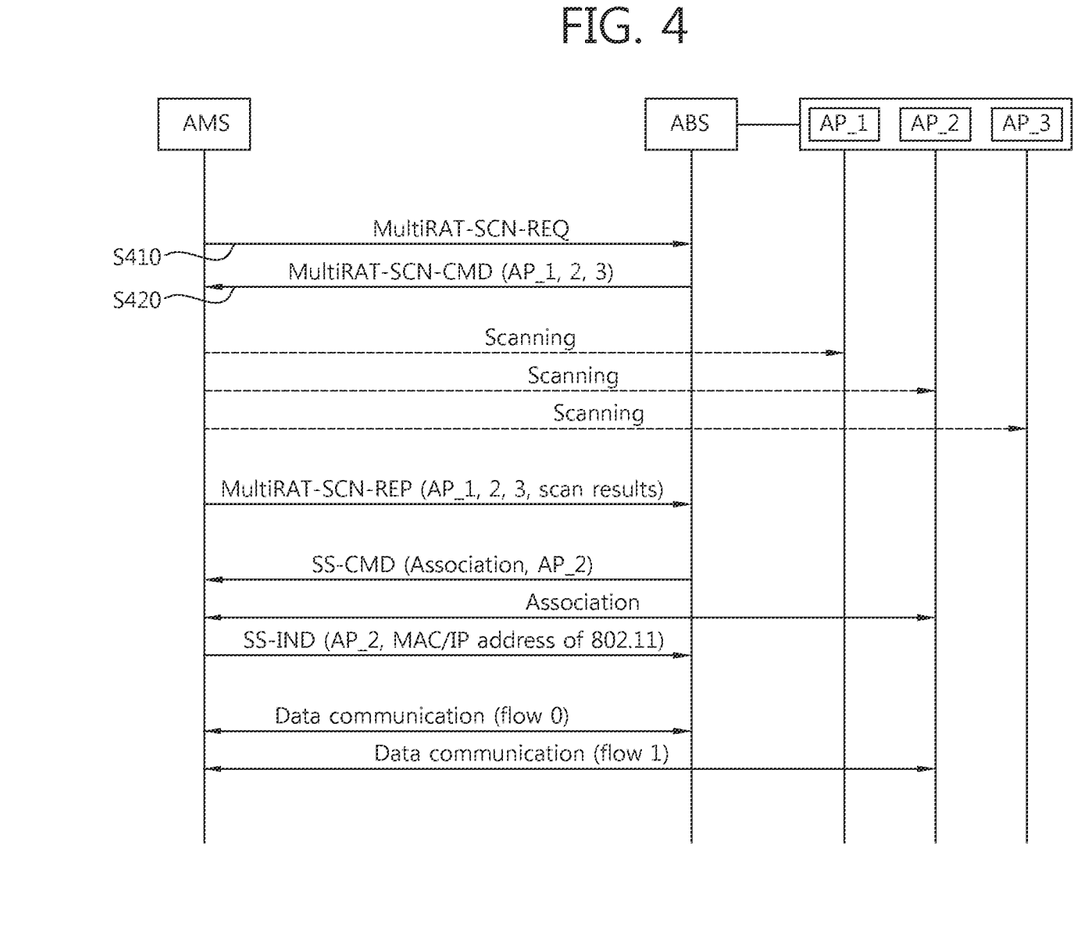

FIG. 3 and FIG. 4 show AMS-initiated AP scanning according to an embodiment of the present invention.

Referring to FIG. 3, an AMS can start AP scanning without an instruction of an ABS in order to join with an AP, and can acquire scanning-related information from the ABS in order to perform effective scanning. By considering such a case, the AMS can transmit a message for requesting to join with the AP, such as SS-REQ, to the ABS (S310). Upon receiving the message, the ABS can instruct the AMS to additionally perform AP scanning (S320).

Likewise, in case of FIG. 4, the AMS can acquire scanning-related information from the ABS in order to perform effective AP scanning. Referring to FIG. 4, by transmitting a message such as MultiRAT-SCN-REQ to the ABS (S410), the AMS can request the ABS to transmit a MULTIRAT-SCN-CMD message (S420).

In the following description, the ABS defines information included in the MultiRAT scanning command message which instructs the AMS to perform AP scanning. In addition, the AMS which receives the MultiRAT scanning command message performs AP scanning and thereafter defines information to be transmitted to the ABS.

If it is determined that the AMS needs to transmit and receive data via the secondary system such as the WLAN, the ABS instructs multi-RAT system scanning of the AMS. This can be determined on the basis of a location and/or speed of the AMS, and can be triggered by using a multi-RAT scan command message. The multi-RAT scan command message can include the following parameter to facilitate AP detection of the AMS.

A beacon interval can be included instead of a scan interval included in the conventional AAI_SCN-RSP message. In the AMS, data communication via the primary system may stop during the beacon interval. This is for interference mitigation between the primary system and the secondary system. Meanwhile, both of DL/UL data transmissions may stop, and only UL data transmission may stop.

The remaining parts of information other than the scan interval may be equal to those of information included in the conventional AAI_SCN-RSP message.

AAI_MultiRAT-SCAN-CMD message (=SCAN.request) BSSType (infrastructure BSS, IBSS, or both), BSSID (specific or wildcard BSSID), SSID (desired SSID or the wildcard SSID), ScanType (active or passive scanning), ProbeDelay (Delay to be used prior to transmitting a Probe frame), ChannelList (a list of channels that are examined when scanning for a BSS), MinChannelTime (The minimum time to spend on each channel when scanning), MaxChannelTime (The maximum time to spend on each channel when scanning), RequestInformation (optional), VendorSpecificInfo Upon receiving a Multi-RAT scan command message, the AMS delivers the message to MAC, and starts to scan the neighbor AP on the basis of the information included in the message.

A scanning result can be reported to the ABS, periodically, at one time or when trigger condition(s) is satisfied. The following parameter can be included in the multi-RAT scan response.

AAI_MultiRAT-SCAN-RSP message (=SCAN.confirm) BSSDescriptionSet (to indicate the results of the scan request), BSSDescriptionFromMeasurementPilotSet (to indicate the results of the scan request derived from Measurement Pilots), ResultCode (Indicates the result of the MLMESCAN confirm primitive), VendorSpecificInfo, HT Capabilities, HT Operation, BSSMembershipSelectorSet, BSSBasicMCSSet, HTOperationalMCSSet, ExtendedCapabilities, 20/40 BSS Coexistence, OverlappingBSS ScanParameters Meanwhile, if an overall traffic load of a cell supported by the ABS exceeds a specific traffic threshold, data traffic generated by an AMS located in the coverage of the secondary system among multi-system AMSs located in the cell, e.g., an AMS located in a WLAN area, is preferably transmitted via the secondary system. That is, in order to avoid a traffic overload of the ABS and to effectively manage data traffic of the ABS, a specific threshold can be configured, and data traffic generated by the AMS can be offloaded to the secondary system.

For example, if a specific first threshold is configured and the overall traffic load of the cell supported by the ABS exceeds the first threshold, data traffic generated by the AMS located in an edge area of the cell can be offloaded to the secondary system. That is, the data traffic can be offloaded on the basis of the location of the AMS in the cell.

In this case, the location of the AMS in the cell can be acquired on the basis of a carrier to interference ratio (CINR) and/or a received signal strength indicator (RSSI) between the AMS and the ABS. For example, an AMS of which a CINR and/or an RSSI are less than or equal to a specific value is assumed to be located in the edge area of the cell, and the AMS is preferentially offloaded.

In addition, if the overall traffic load of the cell supported by the ABS is continuously increased to exceed a specific second threshold, data traffic generated by all AMSs in the cell can be offloaded to the secondary system. Herein, the second threshold may have the same value as the first threshold.

In addition, if the overall traffic load of the cell supported by the ABS exceeds a specific threshold n or more times (e.g $n>=1$, n is an integer), data traffic generated by all AMSs in the cell can be offloaded to the secondary system.

If the data traffic of the AMS is offloaded to the secondary system, for example, if a service provided to a cellular network is switched to a WLAN, the ABS can be requested to manage the data traffic, and according to the aforementioned method, an overload caused thereby can be decreased.

Figure 5:
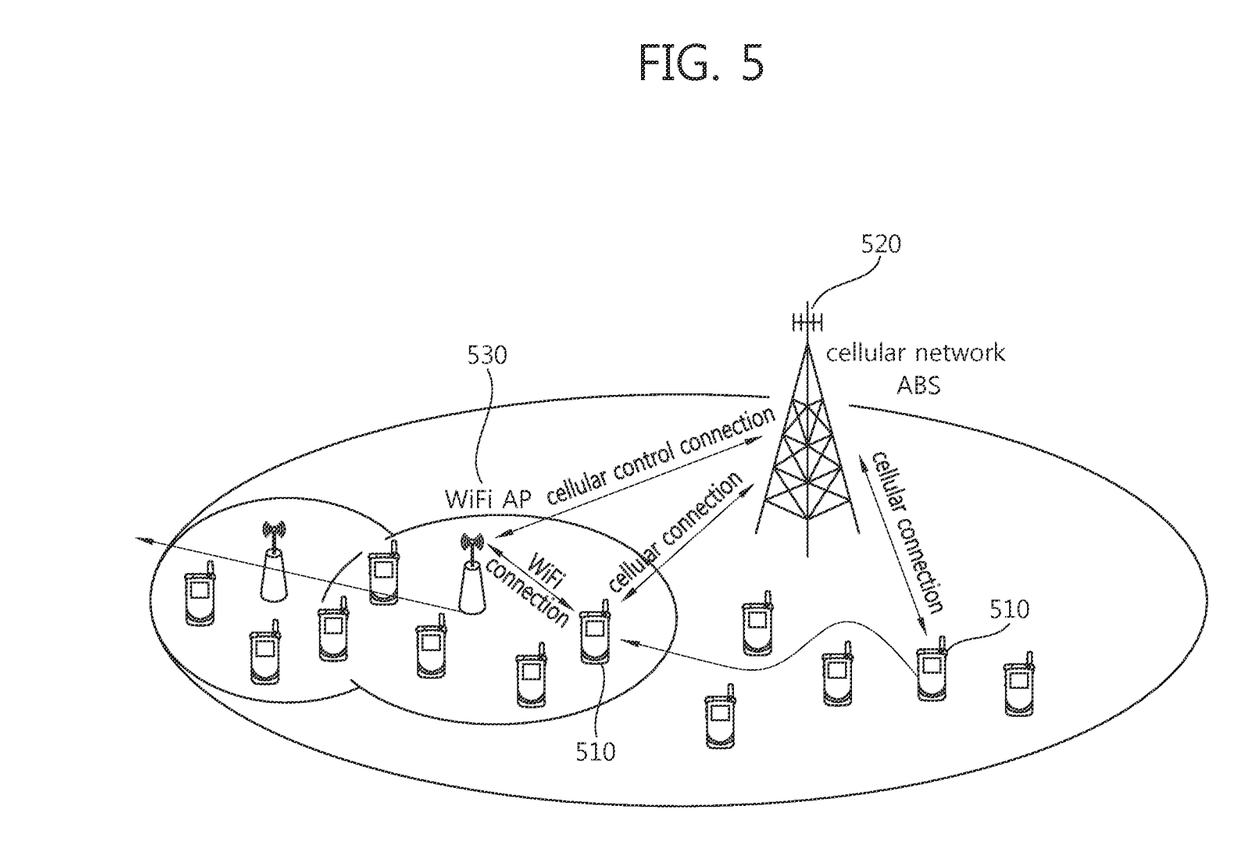
FIG. 5 shows an example of a mobile communication system to which an offloading method is applied according to an embodiment of the present invention.

FIG. 5 shows an example of a mobile communication system to which an offloading method is applied according to an embodiment of the present invention.

Referring to FIG. 5, a multi-system AMS 510 is connected to a cellular network ABS 520 through a cellular connection. The multi-system AMS 510 can be connected to a WiFi AP 530 through a WiFi connection. Further, the cellular network ABS 520 is connected to the WiFi AP 530 through a cellular control connection.

When the multi-system AMS 510 performs data transmission via the secondary system, downlink (DL) data is subjected to IP flow mapping by the cellular network ABS 520 so that it is transmitted to the multi-system AMS 510 via the WiFi AP 530, and uplink (UL) data is transmitted via the WLAN.

Figure 6:
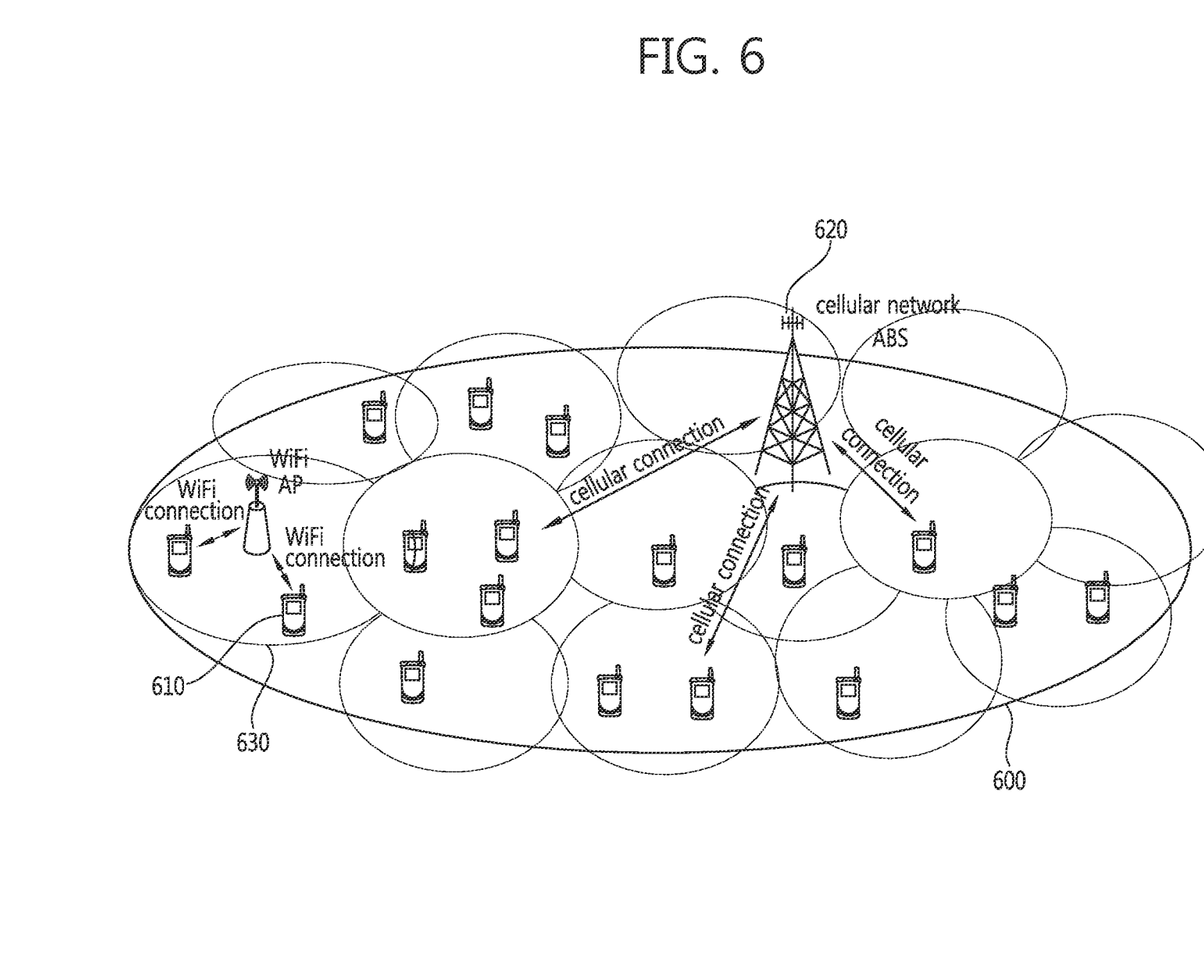
FIG. 6 shows an example of a case of using an offloading method according to an embodiment of the present invention.

FIG. 6 shows an example of a case of using an offloading method according to an embodiment of the present invention.

Referring to FIG. 6, if an overall traffic load of a cell 600 supported by a cellular network ABS 620 exceeds a first traffic threshold, data traffic generated by an AMS 610 located in an edge area of the cell can be offloaded to a secondary system 630.

Meanwhile, information regarding the overall traffic load of the cell supported by the ABS can be reported to the AMS so as to instruct or recommend the AMS to perform data communication via the secondary system.

For one example, while monitoring a traffic load in the cell, if the traffic load in the cell exceeds a specific threshold, the ABS can transmit to the AMS a newly defined unicast message, multicast message, or broadcast message such as AAI_TRF-REP. In this case, the newly defined message such as the AAI_TRF-REP includes information for reporting traffic of the cell supported by the ABS.

For another example, the conventional message such as a super frame header (SFH), system configuration descriptor (SCD), etc., can be used to transmit information regarding the overall traffic load of the cell supported by the ABS.

If a unicast message or a multicast message is used to transmit the information regarding the overall traffic load of the cell supported by the ABS, the message can be transmitted to an offloading target AMS, and the offloading target AMS can perform a certain procedure for performing data transmission via the secondary system on the basis of the message. For example, if the secondary system is a WLAN, the offloading target AMS can perform a certain procedure for establishing a connection with the WLAN, such as scanning of neighboring APs.

In a case where the broadcast message is used to transmit the information regarding the overall traffic load of the cell supported by the ABS, if the AMS which receives the message is in the coverage of the secondary system and there is data traffic to be transmitted and/or received, the AMS can offload the data traffic to the secondary system on the basis of the message. For example, if the overall traffic load of the cell supported by the ABS exceeds a specific threshold, the AMS which receives the message preferably offloads the data traffic to the secondary system.

The aforementioned messages may be transmitted periodically or in an event-triggered manner. If the message is transmitted periodically, the AMS can determine the offloading of the data traffic on the basis of the information regarding the overall traffic load of the cell supported by the ABS and included in the message. If the message is transmitted in the event-triggered manner, the ABS can transmit the message when the traffic load in the cell exceeds a specific threshold or decreases below the specific threshold. Further, if the message is transmitted in the event-trigger manner and the traffic load in the cell exceeds the specific threshold, it can be configured such that the message is transmitted periodically. In general, a unicast message is preferably transmitted in the event-trigger manner, and the broadcast message is preferably transmitted periodically or by combining the periodical transmission manner and the event-triggered manner.

Meanwhile, the aforementioned messages can indicate the information regarding the overall traffic load of the cell supported by the ABS in a status value such as high/medium/low or saturated/risky/stable or the like. For example, if the traffic load in the cell is in the range of 0 to 500 kbytes, it can be indicated as 'low', if the traffic load is in the range of 500 kbytes to 1 Gbytes, it can be indicated as 'medium', and if the traffic load is above 1 Gbytes, it can be indicated as 'high'. In addition, the traffic load in the cell can also be indicated by an absolute data size such as 500 kbytes.

Meanwhile, the AMS which receives the message including the information regarding the overall traffic load of the cell supported by the ABS can switch the data traffic to the secondary system on the basis of the offloading trigger condition. That is, even if the AMS receives the aforementioned message, offloading may not be performed on all AMSs, but may be performed only an AMS which satisfies the offloading trigger condition.

The offloading trigger condition may be a condition predetermined in the multi-RAT system. For example, whether to perform offloading to the secondary system can be determined on the basis of: 1) whether the AMS is located in the coverage of the secondary system; 2) whether a data traffic size of the AMS exceeds a specific threshold; 3) quality of service (QoS) Of the data traffic of the AMS; 4) whether signal strength between the AMS and the ABS is equal to or less than a specific threshold; and 5) if the secondary system is the WLAN, whether the signal strength between the AMS and the ABS is greater than or equal to the specific threshold. More specifically, in the aforementioned offloading trigger condition 3), if the QoS of the data traffic of the AMS satisfies best efforts and/or a non-real time Polling Service (nrtPS), the AMS can offload the data traffic to the secondary system. In the aforementioned offloading trigger conditions 4) and 5), the signal strength can be acquired on the basis of a CINR and/or an RSSI.

The AMS (or ABS) may define complex trigger conditions by including multiple conditions within the same trigger definition. The AMS shall perform a logical AND of all the conditions in a complex trigger condition and invoke the flow switching only when all trigger conditions are met. The conditions can also be configured by not only the AMS but also the ABS or the AP.

Figure 7:
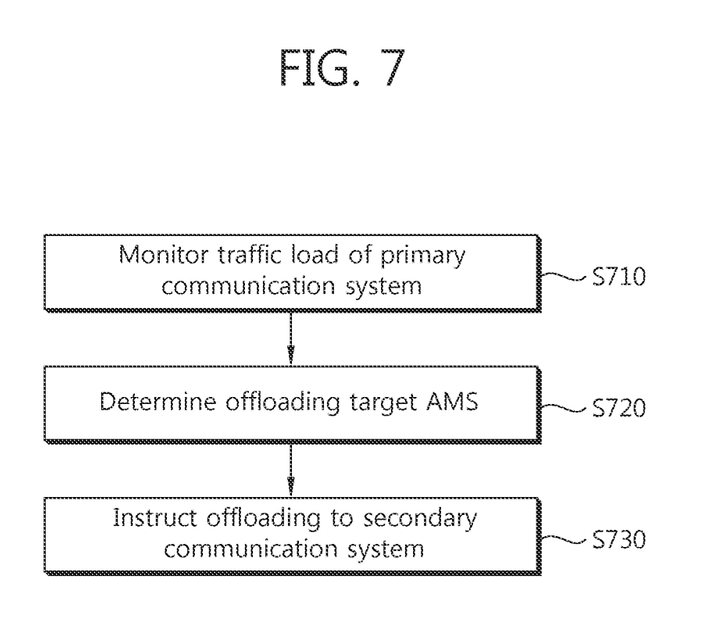
FIG. 7 is a flowchart showing a communication method performed by an advanced base station (ABS) according to an embodiment of the present invention.

FIG. 7 is a flowchart showing a communication method performed by an ABS according to an embodiment of the present invention.

In a mobile communication system including a primary communication system and a secondary communication system, the ABS monitors a traffic load of primary communication (S710). As described above, the primary communication system is a communication system having a wider coverage such as WiMAX or LTE, and the secondary communication system is a communication system having a smaller coverage such as 802.11-based WLAN. The ABS monitors a traffic load by using a method in which information regarding an overall traffic load of a cell supported by the ABS is indicated by a status value such as high/medium/low or saturated/risky/stable or the like.

The ABS determines an offloading target AMS on the basis of the monitored traffic load (S720). If the traffic load exceeds a specific first threshold, the ABS can determine an AMS located in an edge area of the cell supported by the ABS as the offloading target AMS. A location of the AMS can be acquired on the basis of a CINR and/or an RSSI between the AMS and the ABS. If the traffic load further increases to exceed a specific second threshold, the ABS can determine all AMSs in the cell as the offloading target AMS.

The ABS instructs the offloading target AMS to perform offloading to the secondary communication system (S730). That is, the ABS instructs to offload data traffic generated by the offloading target AMS to the secondary communication system. In S730, the ABS can transmit a message for scanning neighbor APs located around the offloading target AMS.

Figure 8:
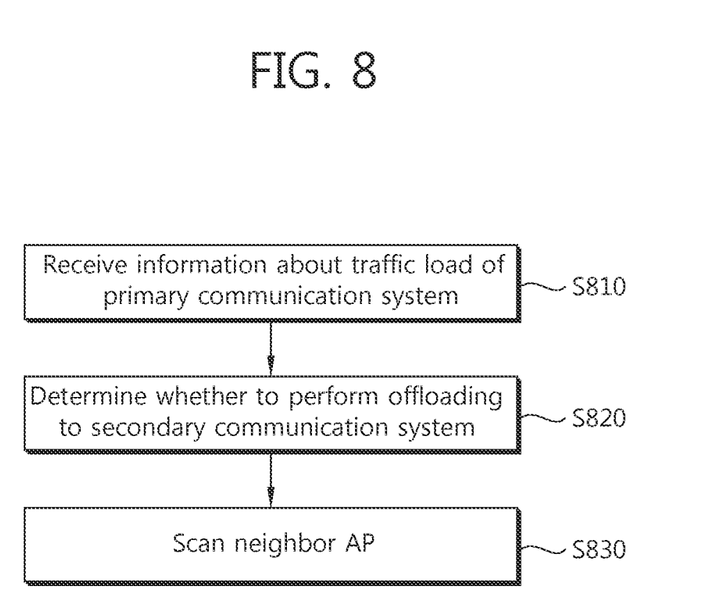
FIG. 8 is a flowchart showing a communication method performed by an AMS according to an embodiment of the present invention.

FIG. 8 is a flowchart showing a communication method performed by an AMS according to an embodiment of the present invention.

In a mobile communication system including a primary communication system and a secondary communication system, the AMS receives information regarding a traffic load of the primary communication system from the ABS (S810). As described above, the primary communication system is a communication system having a wider coverage such as WiMAX or LTE, and the secondary communication system is a communication system having a smaller coverage such as 802.11-based WLAN.

The AMS determines whether to perform offloading to the secondary communication system on the basis of the traffic load of the primary communication system (S820). In S820, the AMS can confirm whether the offloading trigger condition is satisfied, and can determine whether to perform offloading by considering the offloading trigger condition together with the traffic load. That is, whether to perform offloading to the secondary communication system can be determined on the basis of the traffic load and the offloading trigger condition. As described above, as the offloading trigger condition, the AMS can consider: 1) whether the AMS is located in the coverage of the secondary system; 2) whether a data traffic size of the AMS exceeds a specific threshold; 3) quality of service (QoS) Of the data traffic of the AMS; 4) whether signal strength between the AMS and the ABS is equal to or less than a specific threshold; and 5) if the secondary system is the WLAN, whether the signal strength between the AMS and the ABS is greater than or equal to the specific threshold.

For example, the AMS confirms whether the AMS is located in the coverage of the secondary communication system. If the traffic load of the primary communication system exceeds a third traffic threshold and if the AMS is located in the secondary communication system, the AMS can determine to perform offloading to the secondary communication system.

For example, the AMS confirms a size of data traffic generated by the AMS. If the traffic load of the primary communication system exceeds the specific third traffic threshold and if a size of data traffic generated by the AMS exceeds a specific fourth traffic threshold, the AMS can determine to perform offloading to the secondary communication system.

For example, the AMS confirms QoS of the data traffic generated by the AMS, and the AMS determines whether to perform offloading to the secondary communication system on the basis of the QoS and the traffic load of the primary communication system.

For example, the AMS confirms signal strength between the AMS and an ABS. The signal strength can be acquired on the basis of a CINR and/or an RSSI. If the traffic load of the primary communication system exceeds the specific third traffic threshold and if the signal strength between the AMS and the ABS is less than or equal to a specific threshold, the AMS can determine to perform offloading to the secondary communication system.

For example, the AMS confirms signal strength between the AMS and the AP. The signal strength can be acquired on the basis of a CINR and/or an RSSI. If the traffic load of the primary communication system exceeds the specific third traffic threshold and if the signal strength between the AMS and the AP is greater than or equal to a specific threshold, the AMS can determine to perform offloading to the secondary communication system.

If offloading to the secondary communication system is performed, the AMS can scan neighbor APs (S830).

Figure 9:
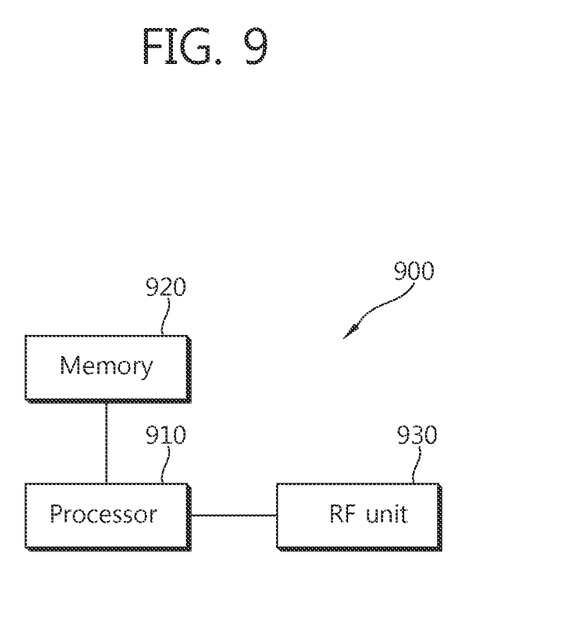
FIG. 9 is a block diagram showing an AMS according to an embodiment of the present invention.

FIG. 9 is a block diagram showing an AMS according to an embodiment of the present invention.

An AMS 900 includes a processor 910, a memory 920, and a radio frequency (RF) unit 930. The memory 920 is connected to the processor 910, and stores a variety of information for driving the processor 910. The RF unit 930 is connected to the processor 910, and transmits and/or receives a radio signal.

The processor 910 implements the proposed functions, procedures, and/or methods. The processor 910 can implement the operation of the AMS according to the embodiment of the present invention. For example, the processor 910 can implement the operation of the AMS according to the embodiment of FIG. 9.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a baseband circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be connected to the processor by using various well-known means.

According to the present invention, an advanced base station (ABS) can flexibly perform offloading on the basis of a data traffic state of a cellular network, thereby effectively managing data traffic. Further, an overload of the cellular network can be avoided.

In addition, according to the present invention, the ABS can more easily manage data traffic of an advanced mobile station (AMS).

Although the aforementioned exemplary system has been described on the basis of a flowchart in which steps or blocks are listed in sequence, the steps of the present invention are not limited to a certain order. Therefore, a certain step may be performed in a different step or in a different order or simultaneously with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A communication method performed by a base station in a mobile communication system, the method comprising:
   monitoring a traffic load of a primary communication system;
   determining an offloading target mobile station based on the traffic load of the primary communication system; and
   instructing the offloading target mobile station to perform offloading to a secondary communication system such that the offloading target mobile station performs the offloading to the secondary communication system when the traffic load of the primary communication system exceeds a first traffic threshold and a size of data traffic generated by the offloading target mobile station exceeds a second traffic threshold.

2. The method of claim 1,
   wherein the primary communication system is based on institute of electrical and electronics engineers (IEEE) 802.16 or long term evolution (LTE), and
   the secondary communication system is an IEEE 802.11-based wireless local area network (WLAN).

3. The method of claim 1, wherein the instructing the offloading target mobile station comprises transmitting a message for instructing the offloading target mobile station to scan neighbor access points (APs).

4. The method of claim 1, wherein the offloading target mobile station is determined based on carrier to interference ratio (CINR) or a received signal strength indicator (RSSI) between the offloading target mobile station and the base station.

5. The method of claim 4, wherein, when the traffic load exceeds a third traffic threshold, instructing all mobile stations in the primary communication system to perform offloading to the secondary communication system.

6. A communication method performed by a mobile station in a mobile communication system, the method comprising:
   receiving information on a traffic load of a primary communication system from a base station;
   determining whether to perform offloading to a secondary communication system based on the traffic load of the primary communication system and upon confirming a size of data traffic generated by the mobile station; and
   if the traffic load of the primary communication system exceeds a first traffic threshold and the size of the data traffic generated by the mobile station exceeds a second traffic threshold, offloading to the secondary communication system.

7. The method of claim 6,
   wherein the primary communication system is based on IEEE 802.16 or LTE, and
   the secondary communication system is an IEEE 802.11-based WLAN.

8. The method of claim 6, wherein the offloading to the secondary communication system comprises scanning a neighbor access point (AP).

9. The method of claim 6,
   wherein the determining whether to perform the offloading further comprises confirming whether the mobile station is located in the coverage of the secondary communication system, and
   wherein the offloading to the secondary communication system is performed if the traffic load of the primary communication system exceeds the first traffic threshold and the size of the data traffic generated by the mobile station exceeds the second traffic threshold, and when the mobile station is determined to be located in the coverage of the secondary communication system.

10. The method of claim 6,
wherein the determining whether to perform the offloading further comprises confirming a quality of service (QoS) of the data traffic generated by the mobile station, and
wherein the offloading to the secondary communication system is performed if the traffic load of the primary communication system exceeds the first traffic threshold and the size of the data traffic generated by the mobile station exceeds the second traffic threshold, and based on the QoS.

11. The method of claim 6,
wherein the determining whether to perform the offloading further comprises confirming a carrier to interference ratio (CINR) between the mobile station and the base station, and
wherein the offloading to the secondary communication system is performed if the traffic load of the primary communication system exceeds the first traffic threshold and the size of the data traffic generated by the mobile station exceeds the second traffic threshold, and when the CINR between the mobile station and the base station is less than or equal to a mobile station/base station CINR threshold.

12. The method of claim 8,
wherein the determining whether to perform the offloading further comprises confirming a CINR between the mobile station and the neighbor AP, and
wherein the offloading to the secondary communication system is performed if the traffic load of the primary communication system exceeds the first traffic threshold and the size of the data traffic generated by the mobile station exceeds the second traffic threshold, and when the CINR between the mobile station and the neighbor AP exceeds a mobile station/neighbor AP CINR threshold.

13. A mobile station in a mobile communication system, the mobile station comprising:
a radio frequency (RF) unit for transmitting and receiving a radio signal; and
a processor operatively connected to the RF unit and configured to implement a radio interface protocol, wherein the processor is further configured to:
receive information on a traffic load of a primary communication system from a base station;
determine whether to perform offloading to a secondary communication system based on the traffic load of the primary communication system and upon confirming a size of data traffic generated by the mobile station; and
if the traffic load of the primary communication system exceeds a first traffic threshold and the size of the data traffic generated by the mobile station exceeds a second traffic threshold, offload to the secondary communication system.

14. The mobile station of claim 13,
wherein the processor is further configured to scan a neighbor access point (AP).

\* \* \* \* \*